United States Patent
Ishizaki et al.

(10) Patent No.: US 11,208,915 B2
(45) Date of Patent: Dec. 28, 2021

(54) DRIVING DEVICE, VALVE APPARATUS INCLUDING THE SAME, AND LINK DRIVING MECHANISM FOR TURBOCHARGER

(71) Applicant: MITSUBISHI HEAVY INDUSTRIES ENGINE & TURBOCHARGER, LTD., Sagamihara (JP)

(72) Inventors: Tatsuya Ishizaki, Tokyo (JP); Yuta Ishii, Sagamihara (JP); Takaya Futae, Tokyo (JP); Noriyuki Hayashi, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 16/964,830

(22) PCT Filed: Jan. 30, 2018

(86) PCT No.: PCT/JP2018/002990
§ 371 (c)(1),
(2) Date: Jul. 24, 2020

(87) PCT Pub. No.: WO2019/150436
PCT Pub. Date: Aug. 8, 2019

(65) Prior Publication Data
US 2021/0062676 A1 Mar. 4, 2021

(51) Int. Cl.
*F01D 17/16* (2006.01)
*F02B 37/18* (2006.01)
*F02C 6/12* (2006.01)

(52) U.S. Cl.
CPC .......... *F01D 17/165* (2013.01); *F02B 37/186* (2013.01); *F02C 6/12* (2013.01);
(Continued)

(58) Field of Classification Search
CPC ........ F02B 37/24; F02B 37/186; F01D 17/16; F01D 17/162; F01D 17/165;
(Continued)

(56) References Cited

U.S. PATENT DOCUMENTS

| 5,715,996 A | 2/1998 | Cooper et al. |
| 6,050,775 A | 4/2000 | Erdmann et al. |

(Continued)

FOREIGN PATENT DOCUMENTS

| CN | 101644184 A | 2/2010 |
| CN | 102892994 A | 1/2013 |

(Continued)

OTHER PUBLICATIONS

Extended European Search Report dated Oct. 2, 2020, issued in European application No. 18904185.8.
(Continued)

*Primary Examiner* — Audrey B. Walter
*Assistant Examiner* — Edward Bushard
(74) *Attorney, Agent, or Firm* — Birch, Stewart, Kolasch & Birch, LLP.

(57) ABSTRACT

A driving device includes: a shaft; and a cylindrical bush having an insertion hole into which the shaft can be inserted. The insertion hole includes an opening portion having an inner diameter decreasing from a first end surface toward a second end surface of the bush, and a small-diameter hole portion extending from an end of the opening portion to the second end surface. The shaft includes a shaft portion having an outer diameter smaller than an inner diameter of the small-diameter hole portion, and an abutment portion having an outer diameter greater than the inner diameter of the small-diameter hole portion. The bush has a sealing surface defining the opening portion. The abutment portion of the shaft abuts on the sealing surface of the bush in an axial (Continued)

direction of the insertion hole to seal a gap formed between the shaft and the bush inside the insertion hole.

7 Claims, 11 Drawing Sheets

(52) U.S. Cl.
CPC .... *F05D 2220/40* (2013.01); *F05D 2240/128* (2013.01); *F05D 2240/55* (2013.01)

(58) Field of Classification Search
CPC ...... F04D 27/002; F04D 27/0246; F02C 6/12; F05D 2240/128; F05D 2240/55; F05D 2220/40

See application file for complete search history.

(56) References Cited

U.S. PATENT DOCUMENTS

| | | | |
|---|---|---|---|
| 8,096,754 B2 | 1/2012 | Naemura et al. | |
| 2006/0022162 A1 | 2/2006 | Sampson | |
| 2009/0301083 A1* | 12/2009 | Rayner | F01D 17/165 60/602 |
| 2013/0089411 A1* | 4/2013 | Ward | F04D 29/102 415/151 |
| 2015/0097345 A1* | 4/2015 | House | F02B 39/16 277/585 |
| 2016/0076439 A1 | 3/2016 | Martens et al. | |

FOREIGN PATENT DOCUMENTS

| | | |
|---|---|---|
| CN | 104271919 A | 1/2015 |
| CN | 204082317 U | 1/2015 |
| CN | 105422191 A | 3/2016 |
| CN | 105626164 A | 6/2016 |
| DE | 19752534 C1 | 10/1998 |
| JP | 62-12735 U | 1/1987 |
| JP | 63-69733 U | 5/1988 |
| JP | 1-179132 U | 12/1989 |
| JP | 5-935 U | 1/1993 |
| JP | 2005-351089 A | 12/2005 |
| JP | 3905818 B2 | 4/2007 |
| JP | 5106818 B2 | 12/2012 |
| JP | 2013-530337 A | 7/2013 |
| JP | 2016-186241 A | 10/2016 |

OTHER PUBLICATIONS

International Prefithinary Report on Patentability and Written Opinion of the International Searching Authority with an Engiish translation, dated Aug. 13, 2020, for International Application No. PCT/JP2018/002990.

International Search Report dated Mar. 27. 2018, for International Application No. PCT/JP2018/002990, with an English translation.

Office Action dated Jun. 28, 2021 issued in counterpart Chinese Application No. 201880085473.2 with machine translation.

\* cited by examiner

DRIVING DEVICE, VALVE APPARATUS INCLUDING THE SAME, AND LINK DRIVING MECHANISM FOR TURBOCHARGER

TECHNICAL FIELD

The present disclosure relates to a driving device, a valve apparatus including the driving device, and a link driving mechanism for a turbocharger.

BACKGROUND

A turbocharger is provided with a waste-gate valve (WG valve) which is a valve apparatus for controlling the flow rate of exhaust gas supplied to a turbine wheel. The WG valve includes a cylindrical bush attached to a turbine housing, a shaft inserted in the bush, and a valve body attached to the shaft.

To prevent adhesion or galling of the valve apparatus, a gap is provided between the bush and the shaft. In order to prevent leakage of exhaust gas through the gap during operation of the turbocharger, the valve apparatus is configured such that a part of the bush and a part of the shaft are in contact to seal the gap. However, when the shaft is tilted due to pressure of exhaust gas applied to the valve and a force of an actuator for driving the WG valve, and the gap sealing performance is decreased, exhaust gas may leak through the gap.

Patent Document 1 discloses a configuration of a sealing portion for preventing leakage of exhaust gas in the WG valve, with a spherical inner sealing surface formed on the shaft and an outer sealing surface formed on an inner wall portion of the cylindrical bush so as to be contactable with the inner sealing surface.

CITATION LIST

Patent Literature

Patent Document 1: JP2016-186241A

SUMMARY

Problems to be Solved

However, the sealing portion of Patent Document 1 is difficult to process since it is necessary to form the outer sealing surface having a concave spherical shape or a truncated cone shape on the inner wall portion of the cylindrical bush. Patent Document 1 also discloses a configuration in which the outer sealing surface is configured as a separate component in order to improve processability, but in this case, there is a problem that the cost increases due to an increase in the number of components.

In view of the above, an object of at least one embodiment of the present disclosure is to provide a driving device, a valve apparatus including the driving device, and a link driving mechanism for a turbocharger whereby it is possible to suppress leakage of a fluid with a structure easy to process.

Solution to the Problems (1) A driving device according to at least one embodiment of the present invention comprises: a shaft; and a cylindrical bush having an insertion hole into which the shaft can be inserted, the insertion hole including an opening portion having an inner diameter decreasing from a first end surface toward a second end surface of the bush, and a small-diameter hole portion extending from an end of the opening portion to the second end surface, the shaft including a shaft portion having an outer diameter smaller than an inner diameter of the small-diameter hole portion, and an abutment portion having an outer diameter greater than the inner diameter of the small-diameter hole portion, the bush having a sealing surface defining the opening portion, wherein the driving device is configured such that the abutment portion of the shaft abuts on the sealing surface of the bush in an axial direction of the insertion hole so as to seal a gap formed between the shaft and the bush inside the insertion hole.

With the above configuration (1), the bush has an opening portion with an inner diameter decreasing from the first end surface toward the second end surface of the bush so as to form a sealing surface configured to contact an abutment portion of the shaft. Thus, the sealing surface is easy to process compared with the case where the sealing surface is formed inside the bush. Further, since the abutment portion of the shaft abuts on the sealing surface in the axial direction of the insertion hole, when the shaft receives pressure in a direction intersecting the longitudinal direction of the shaft, the sealing surface applies moment to the abutment portion in a direction opposite to the direction in which the shaft is pressed. As a result, the tilting of the shaft is reduced, so that a reduction in sealing performance between the abutment portion and the sealing surface is suppressed. Thus, it is possible to suppress leakage of fluid through the gap formed between the shaft and the bush inside the insertion hole.

(2) In some embodiments, in the above configuration (1), the sealing surface has a truncated cone shape.

With the above configuration (2), since the sealing surface of truncated cone shape is easy to process compared with a curved sealing surface, the sealing surface is easier to process.

(3) In some embodiments, in the above configuration (1) or (2), the abutment portion has a convexly curved shape.

In the case where the sealing surface and the abutment portion both have a truncated conical shape, when the shaft is tilted, a gap may be formed between the sealing surface and the abutment portion, reducing the sealing performance. However, with the above configuration (3), since the abutment portion is convexly curved, the abutment portion can abut on the sealing surface at any part even if the shaft is tilted. Accordingly, a reduction in sealing performance between the abutment portion and the sealing surface is suppressed. Thus, it is possible to suppress leakage of fluid through the gap formed between the shaft and the bush inside the insertion hole.

(4) In some embodiments, in the above configuration (3), the abutment portion has an elliptical spherical shape having a major axis perpendicular or parallel to the axial direction of the insertion hole.

When the shaft is tilted, even if the abutment portion has a spherical shape, as long as the axial center of the insertion hole coincides with the spherical center of the abutment portion, no gap is formed between the sealing surface and the abutment portion. However, if the axial center of the insertion hole deviates from the spherical center of the abutment portion due to resistance such as friction between the bush and the shaft, a gap will be created between the sealing surface and the abutment portion. However, as in the above configuration (4), when the abutment portion has an elliptical spherical shape, even if the axial center of the insertion hole deviates from the elliptical spherical center of the abutment portion, the abutment portion and the sealing surface can come into contact. Thus, it is possible to suppress a reduction in sealing performance between the abutment portion and the sealing surface compared with the case where the abutment portion has a circular shape, and it is possible to suppress leakage of fluid through the gap formed between the shaft and the bush inside the insertion hole.

(5) In some embodiments, in any one of the above configurations (1) to (4), the driving device further comprises an elastic member which provides an elastic force for moving the shaft in a direction such that the abutment portion abuts on the sealing surface.

With the above configuration (5), the elastic force provided by the elastic member increases the force with which the abutment portion abuts on the sealing surface, so that the sealing performance between the abutment portion and the sealing surface is improved. Thus, it is possible to suppress leakage of fluid through the gap formed between the shaft and the bush inside the insertion hole.

(6) In some embodiments, in the above configuration (5), the driving device further comprises a housing having a bush through hole through which the bush passes, the shaft includes a coupling portion to be coupled to an actuator for rotating the shaft, and the elastic member is disposed between the coupling portion and the housing such that the elastic member provides the shaft with the elastic force in a direction of moving the coupling portion away from the housing.

With the above configuration (6), it is easy to secure a space for providing the elastic member compared with the case where the elastic member is disposed between the coupling portion and the second end surface of the bush.

(7) A valve apparatus according to at least one embodiment of the present invention comprises: the driving device described in any one of the above (1) to (6); and a valve body fixed to the shaft.

With the above configuration (7), in the valve apparatus, the tilting of the shaft is reduced, so that a reduction in sealing performance between the abutment portion and the sealing surface is suppressed. Thus, it is possible to suppress leakage of fluid through the gap formed between the shaft and the bush inside the insertion hole.

(8) A link driving mechanism for a turbocharger according to at least one embodiment of the present disclosure comprises: the driving device described in any one of the above (1) to (6); and a nozzle vane fixed to the shaft.

With the above configuration (8), in the link driving mechanism for a turbocharger, the tilting of the shaft is reduced, so that a reduction in sealing performance between the abutment portion and the sealing surface is suppressed. Thus, it is possible to suppress leakage of fluid through the gap formed between the shaft and the bush inside the insertion hole.

(9) A link driving mechanism for a turbocharger according to at least one embodiment of the present disclosure comprises: a rotatable coupling ring having at least one cutout portion; and the driving device described in any one of the above (1) to (6). The driving device has a coupling portion fixed to the shaft and capable of engaging with one of the at least one cutout portion.

With the above configuration (9), in the link driving mechanism for a turbocharger, the tilting of the shaft is reduced, so that a reduction in sealing performance between the abutment portion and the sealing surface is suppressed. Thus, it is possible to suppress leakage of fluid through the gap formed between the shaft and the bush inside the insertion hole.

Advantageous Effects

According to at least one embodiment of the present disclosure, the bush has an opening portion with an inner diameter decreasing from the first end surface toward the second end surface of the bush so as to form a sealing surface configured to contact an abutment portion of the shaft. Thus, the sealing surface is easy to process compared with the case where the sealing surface is formed inside the bush. Further, since the abutment portion of the shaft abuts on the sealing surface in the axial direction of the insertion hole, when the shaft receives pressure in a direction intersecting the longitudinal direction of the shaft, the sealing surface applies moment to the abutment portion in a direction opposite to the direction in which the shaft is pressed. As a result, the tilting of the shaft is reduced, so that a reduction in sealing performance between the abutment portion and the sealing surface is suppressed. Thus, it is possible to suppress leakage of fluid through the gap formed between the shaft and the bush inside the insertion hole.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

First Embodiment

Figure 1:
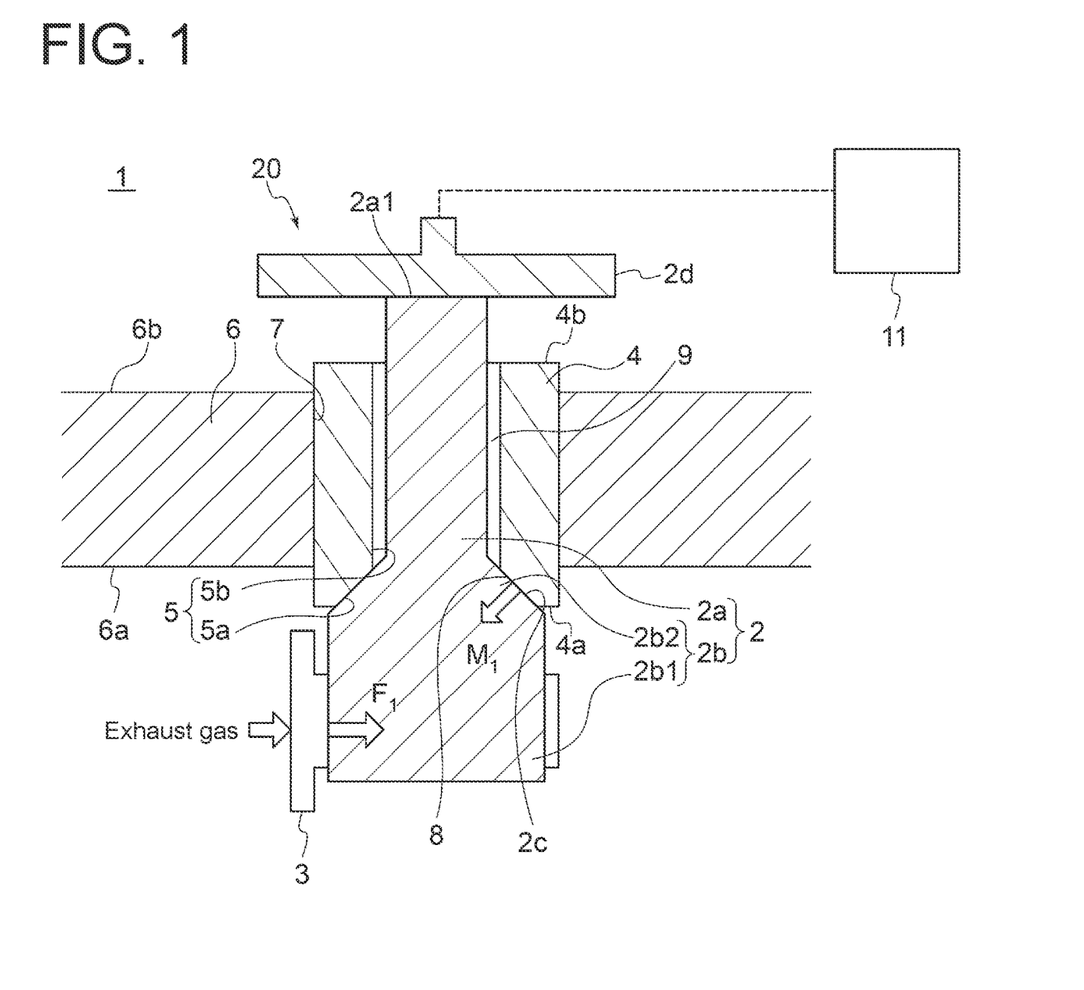
FIG. 1 is a schematic cross-sectional view of a valve apparatus according to a first embodiment of the present disclosure.

As shown in FIG. 1, a valve apparatus 1 according to a first embodiment includes a driving device 20 and a valve body 3. The driving device 20 includes a shaft 2 to which the valve body 3 is fixed and a cylindrical bush 4 having an insertion hole 5 into which the shaft 2 can be inserted. The valve apparatus 1 may be for example, but is not limited to, a waste-gate valve (WG valve) provided in a turbine housing of a turbocharger. In this case, the bush 4 is inserted in a through hole 7 passing through the turbine housing 6 of the turbocharger from an inner surface 6a to an outer surface 6b, and is fixed to the turbine housing 6. In other words, sides of the inner surface 6a and the outer surface 6b of the turbine housing 6, i.e., the inside and outside of the turbine housing 6 are communicated through the insertion hole 5.

Figure 2:
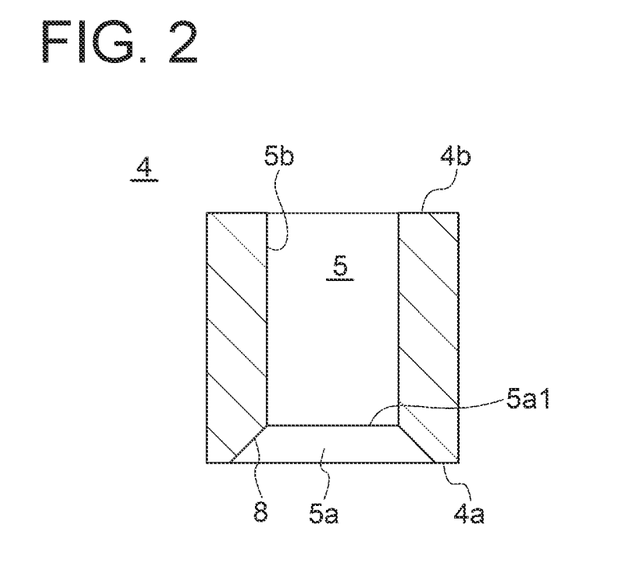
FIG. 2 is a cross-sectional view of a bush of the valve apparatus according to the first embodiment of the present disclosure.

As shown in FIG. 2, the insertion hole 5 includes an opening portion 5a having an inner diameter decreasing from a first end surface 4a toward a second end surface 4b of the bush 4, and a small-diameter hole portion 5b extending from the smaller inner diameter end 5a1 of the opening portion 5a to the second end surface 4b. The small-diameter hole portion 5b is formed with a constant inner diameter from the end 5a1 to the second end surface 4b. The opening portion 5a is defined by a sealing surface 8 of truncated cone shape. Specifically, the sealing surface 8 is a flat surface extending obliquely inward from an inner peripheral edge of the first end surface 4a of the bush 4 to the end 5a1.

As shown in FIG. 1, the shaft 2 includes a shaft portion 2a having an outer diameter smaller than the inner diameter of the small-diameter hole portion 5b, and an abutment portion 2b having an outer diameter greater than the inner diameter of the small-diameter hole portion 5b. The abutment portion 2b includes an abutment surface 2c of truncated cone shape corresponding to the truncated cone shape of the sealing surface 8. More specifically, the abutment portion 2b includes a large-diameter portion 2b1 having a constant diameter, and a reduced-diameter portion 2b2 connecting the large-diameter portion 2b1 and the shaft portion 2a, and the outer peripheral surface of the reduced-diameter portion 2b2 forms the abutment surface 2c. An end 2a1 of the shaft portion 2a is provided with a coupling portion 2d coupled to an actuator 11 for rotating the shaft 2.

When the shaft portion 2a is inserted into the small-diameter hole portion 5b, a gap 9 is formed between the shaft portion 2a of the shaft 2 and the bush 4 inside the small-diameter hole portion 5b. The valve apparatus 1 is configured such that pressure of exhaust gas inside the turbine housing 6 causes the abutment surface 2c of the abutment portion 2b to abut on the sealing surface 8 of the bush 4 in the axial direction of the insertion hole 5 so as to seal the gap 9.

Next, the operation of the valve apparatus 1 according to the first embodiment will be described in conjunction with the case where the valve apparatus 1 is a WG valve.

As shown in FIG. 1, while the gap 9 is sealed by the abutment surface 2c and the sealing surface 8, power of the actuator 11 is transmitted to the shaft 2 via the coupling portion 2d to rotate the shaft 2. With rotation of the shaft 2, the valve body 3 rotates around the shaft 2. In accordance with rotation of the valve body 3, a waste-gate channel (WG channel) bypassing a scroll passage in a turbine of the turbocharger opens or closes.

Inside the turbine housing 6, pressure of exhaust gas is applied to the valve body 3. Thus, a force $F_1$ perpendicular to the longitudinal direction of the shaft 2 is applied to the abutment portion 2b. This causes a moment $M_1$ having components opposite to the direction of the force $F_1$ from the sealing surface 8 to the abutment surface 2c of the abutment portion 2b in contact with the sealing surface 8. As a result, the tilting of the shaft 2 is reduced, so that a reduction in sealing performance between the abutment surface 2c of the abutment portion and 2b the sealing surface 8 is suppressed. Thus, it is possible to suppress leakage of exhaust gas through the gap 9.

Figure 3:
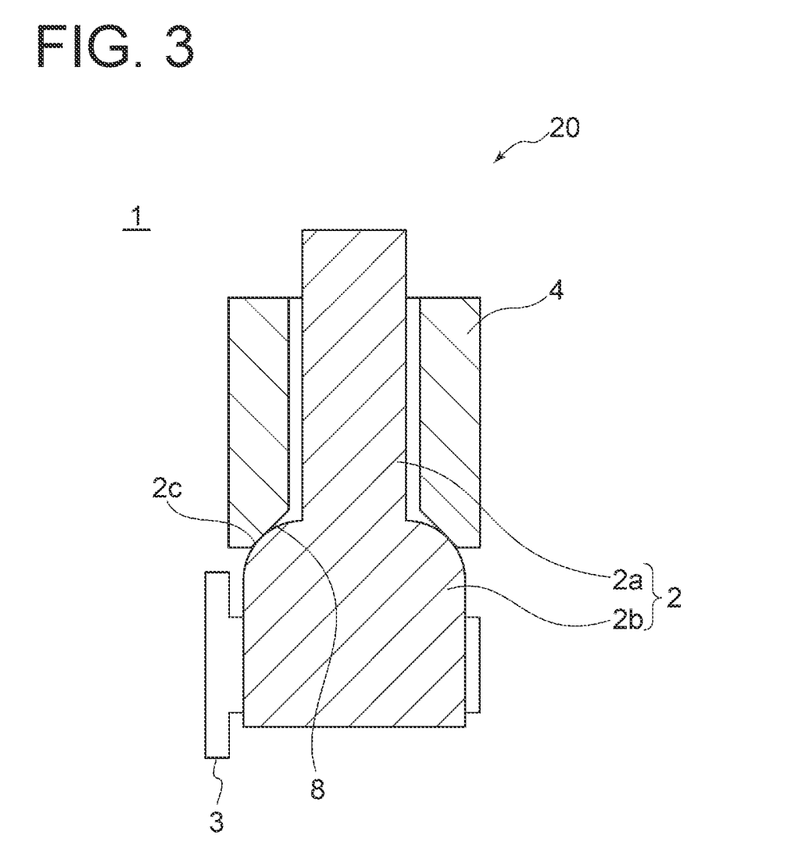
FIG. 3 is a schematic cross-sectional view of a modified example of the valve apparatus according to the first embodiment of the present disclosure.

Although in the first embodiment, the sealing surface 8 and the abutment surface 2c both have a truncated cone shape, the invention is not limited to this embodiment. As shown in FIG. 3, the abutment surface 2c may have a convexly curved shape, for example, a spherical shape. With the configuration of the first embodiment, the tilting of the shaft 2 is reduced, but the possibility that the shaft 2 will tilt cannot be eliminated. In the case where the sealing surface 8 and the abutment surface 2c both have a truncated conical shape, when the shaft 2 is tilted, a gap may be formed between the sealing surface 8 and the abutment surface 2c, reducing the sealing performance. However, with the configuration of FIG. 3, since the abutment surface 2c is convexly curved, the abutment surface 2c can abut on the sealing surface 8 any part even if the shaft 2 is tilted.

Figure 4:
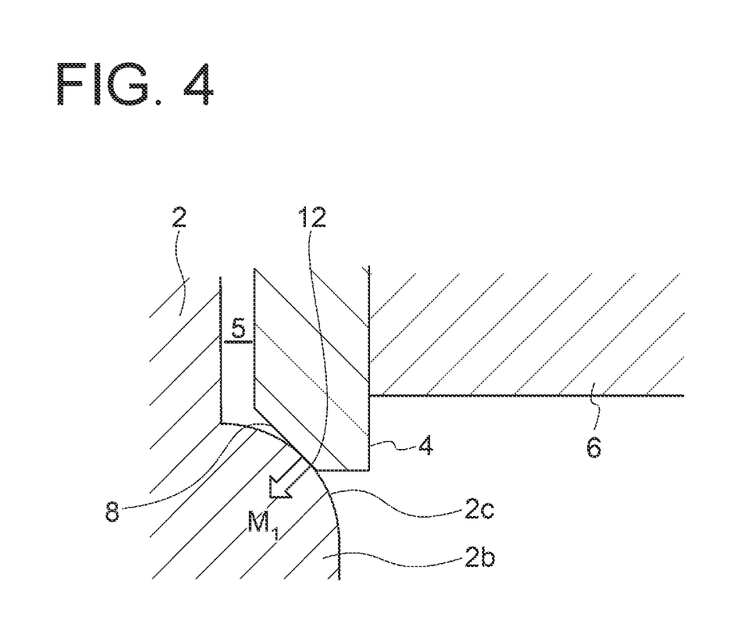
FIG. 4 is an enlarged cross-sectional view of the vicinity of the contact part between the sealing surface and the abutment surface in the valve apparatus of FIG. 3.

Further, in this case, as shown in FIG. 4, it is preferred that the contact part 12 between the sealing surface 8 and the abutment surface 2c is located as radially outward as possible. In the configuration of FIG. 4, the region of the insertion hole 5 occupied by the abutment portion 2b is reduced by the amount that the contact part 12 is located as radially outward as possible, and, since pressure is lower inside the insertion hole 5 than inside the turbine housing 6 where exhaust gas exits, the region where pressure is lower than inside the turbine housing 6 is enlarged. As a result, the pressure difference between the insertion hole 5 and the inside of the turbine housing 6 increases, and the force with which the abutment portion 2b is pressed toward the sealing surface 8 increases, so that the shaft 2 is less likely to tilt. Further, since the contact part 12 is located as radially outward as possible, the length of the arm of the moment $M_1$ is extended, and the moment $M_1$ is increased. This also reduces the tilting of the shaft 2.

Figure 5:
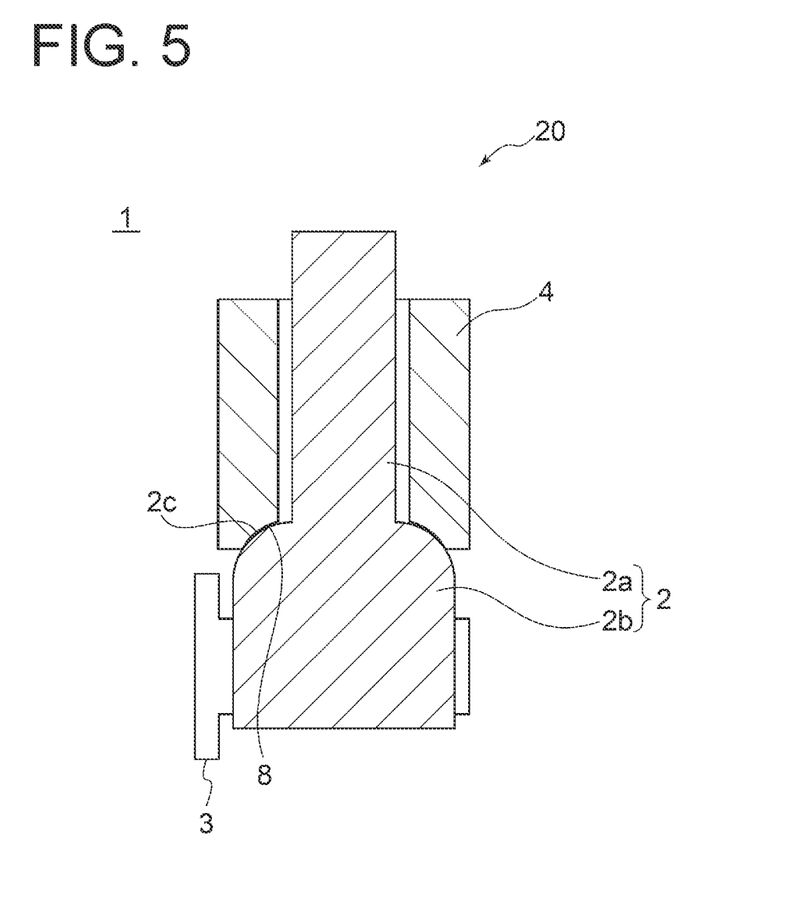
FIG. 5 is a schematic cross-sectional view of another modified example of the valve apparatus according to the first embodiment of the present disclosure.

The sealing surface 8 may not necessarily have a truncated cone shape. In the case where the abutment surface 2c is convexly curved, as shown in FIG. 5, the sealing surface 8 may have a concavely curved shape corresponding to the convexly curved shape of the abutment surface 2c.

Figure 6:
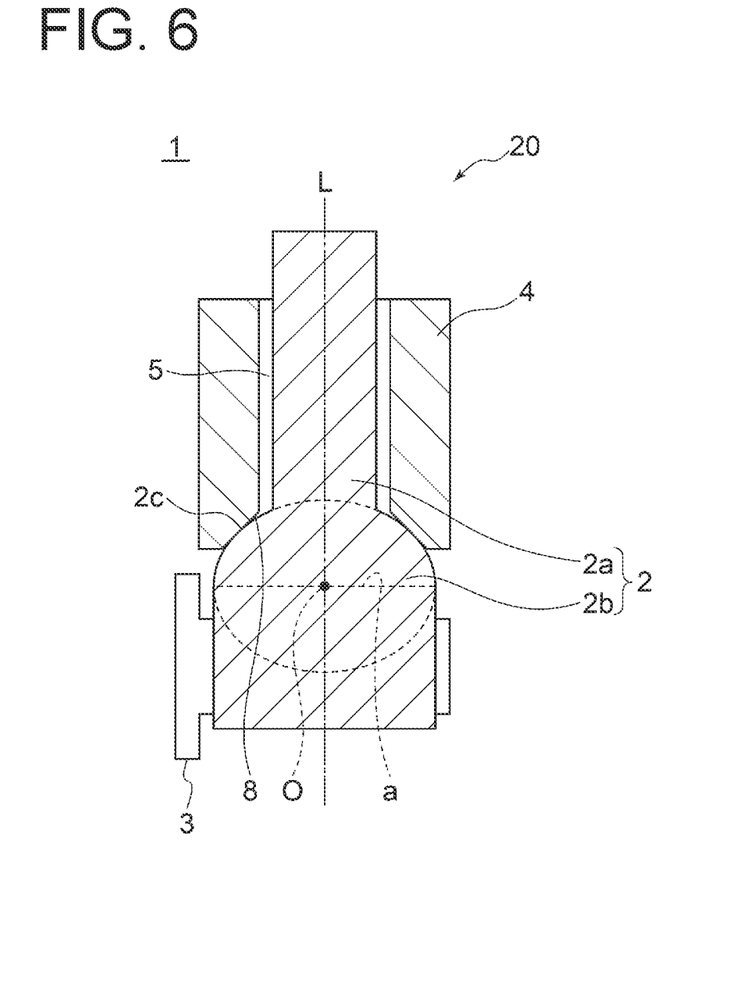
FIG. 6 is a schematic cross-sectional view of still another modified example of the valve apparatus according to the first embodiment of the present disclosure.

In the first embodiment, as shown in FIG. 6, the convexly curved abutment surface 2c may have an elliptical spherical shape having a major axis a in a direction perpendicular to the axial direction of the insertion hole 5. When the shaft 2 is tilted, even if the abutment surface 2c has, for example, a spherical shape, as long as the axial center L of the insertion hole 5 coincides with the spherical center of the abutment surface 2c, no gap is formed between the sealing surface 8 and the abutment surface 2c. However, if the axial center L of the insertion hole 5 deviates from the spherical center of the abutment surface 2c due to resistance such as friction between the bush 4 and the shaft 2, a gap will be created between the sealing surface 8 and the abutment surface 2c.

Figure 7:
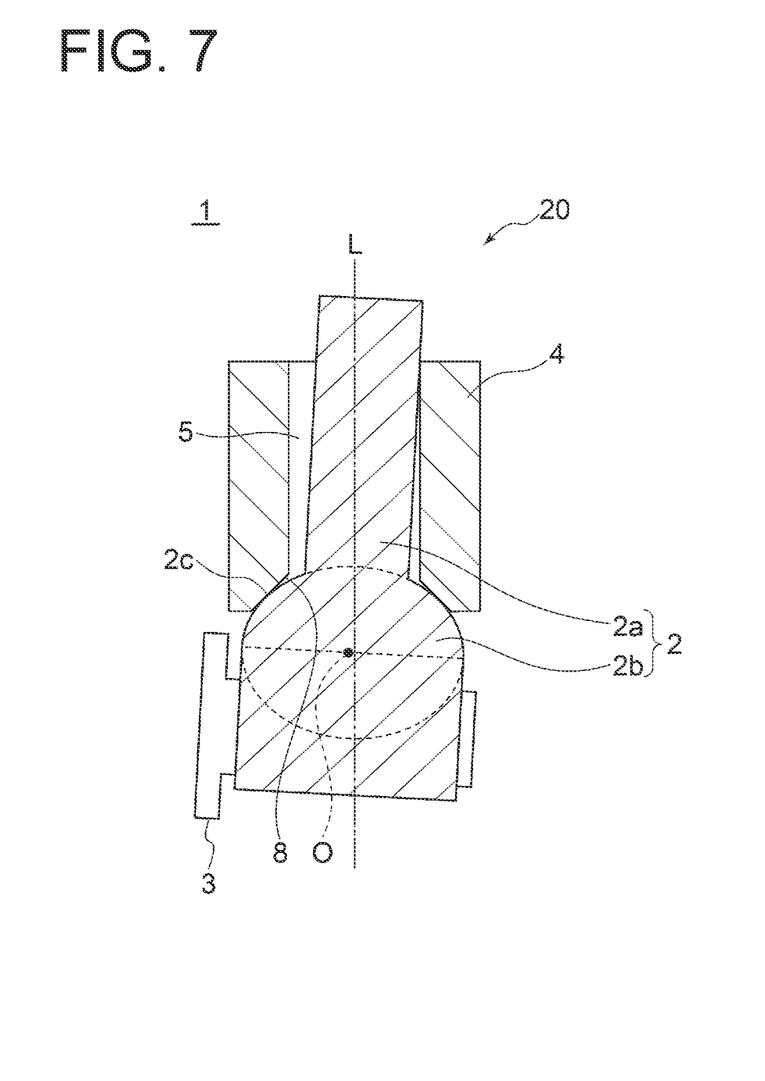
FIG. 7 is a schematic cross-sectional view of the valve apparatus of FIG. 6, where the shaft tilts.

However, when the abutment surface 2c has an elliptical spherical shape, as shown in FIG. 7, even if the axial center L of the insertion hole 5 deviates from the elliptical spherical center O of the abutment surface 2c, the abutment surface 2c and the sealing surface 8 can come into contact. Thus, it is possible to suppress a reduction in sealing performance between the abutment surface 2c and the sealing surface 8 compared with the case where the abutment surface 2c has a circular shape. The same effect can be obtained by a configuration in which the abutment surface 2c has an elliptical spherical shape with a major axis a parallel to the axial direction of the insertion hole 5.

Second Embodiment

Next, a driving device according to a second embodiment will be described. The driving device according to the second embodiment is different from the driving device according to the first embodiment in that an elastic member that provides the shaft 2 with an elastic force for moving the shaft 2 is added. In the second embodiment, the same constituent elements as those in the first embodiment are associated with the same reference numerals and not described again in detail.

Figure 8:
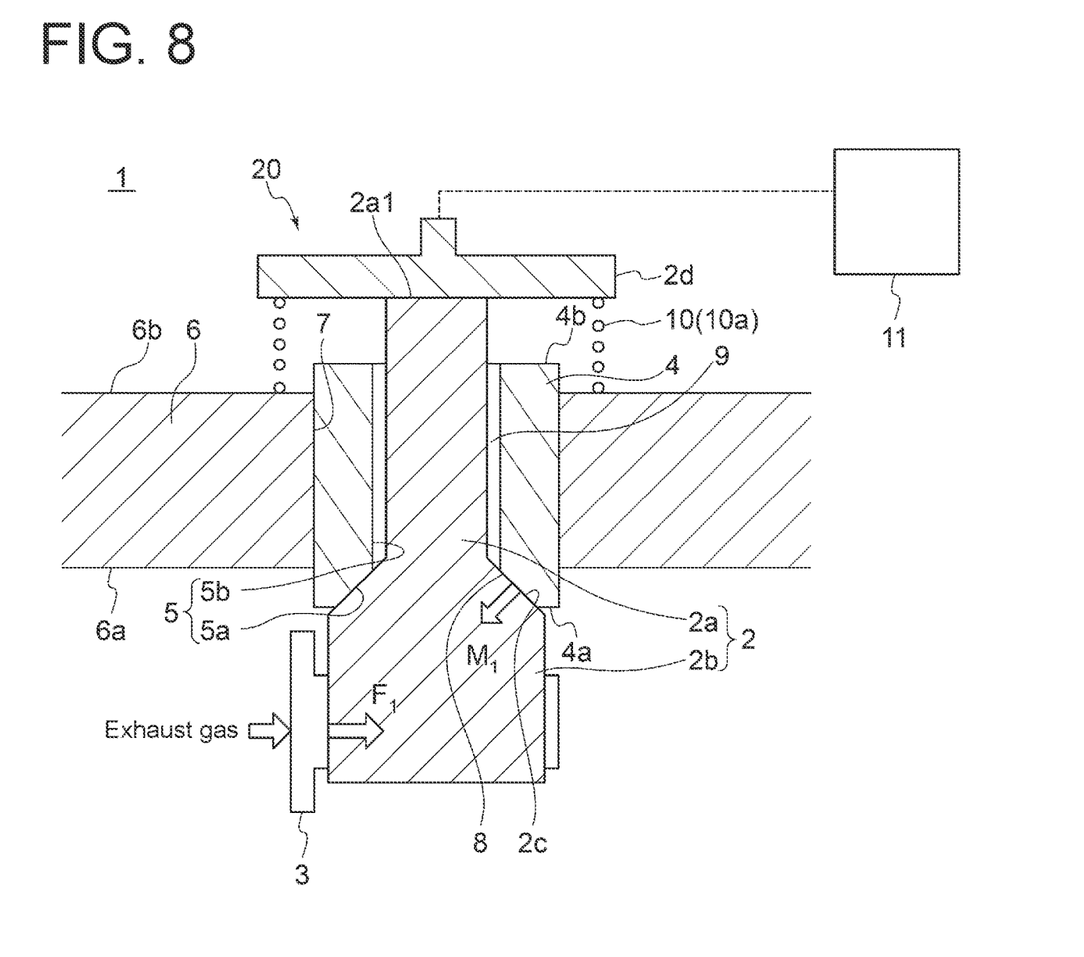
FIG. 8 is a schematic cross-sectional view of a valve apparatus according to a second embodiment of the present disclosure.

As shown in FIG. 8, an elastic member 10 is disposed between the coupling portion 2d and the outer surface 6b of the turbine housing 6. The elastic member 10 may be a spring 10a that abuts at one end on the coupling portion 2d and at the other end on the outer surface 6b. In this case, both ends of the spring 10a may be connected, or may not be connected, to the coupling portion 2d and the outer surface 6b, respectively. The configuration is otherwise the same as that of the first embodiment. In the second embodiment, the abutment surface 2c and the sealing surface 8 may have any of the configurations shown in FIGS. 3 to 7.

The operation of sealing the gap 9 between the sealing surface 8 and the abutment surface 2c while suppressing the tilting of the shaft 2 is the same as that in the first embodiment. In the second embodiment, the spring 10a provides the shaft 2 with an elastic force in a direction of moving the coupling portion 2d away from the outer surface 6b of the turbine housing 6. This elastic force increases the force with which the abutment surface 2c abuts on the sealing surface 8, so that the sealing performance between the abutment surface 2c and the sealing surface 8 is improved. As a result, it is possible to further suppress leakage of exhaust gas through the gap 9.

The spring 10a abuts at one end on the coupling portion 2d and at the other end on the outer surface 6b, but it may abut at one end on the coupling portion 2d and at the other end on the second end surface 4b of the bush 4. However, when the other end of the spring 10a abuts on the outer surface 6b, it is easier to secure a space for providing the spring 10a than when the other end of the spring 10a abuts on the second end surface 4b of the bush 4.

Third Embodiment

Next, a driving device according to a third embodiment will be described. The driving device according to the third embodiment is configured so as to be used in a link driving mechanism for a turbocharger as compared with the first and second embodiments. In the following, the third embodiment will be described in conjunction with the first embodiment, but the third embodiment may have the configuration of the second embodiment. In the third embodiment, the same constituent elements as those in the first embodiment are associated with the same reference numerals and not described again in detail.

Figure 9:
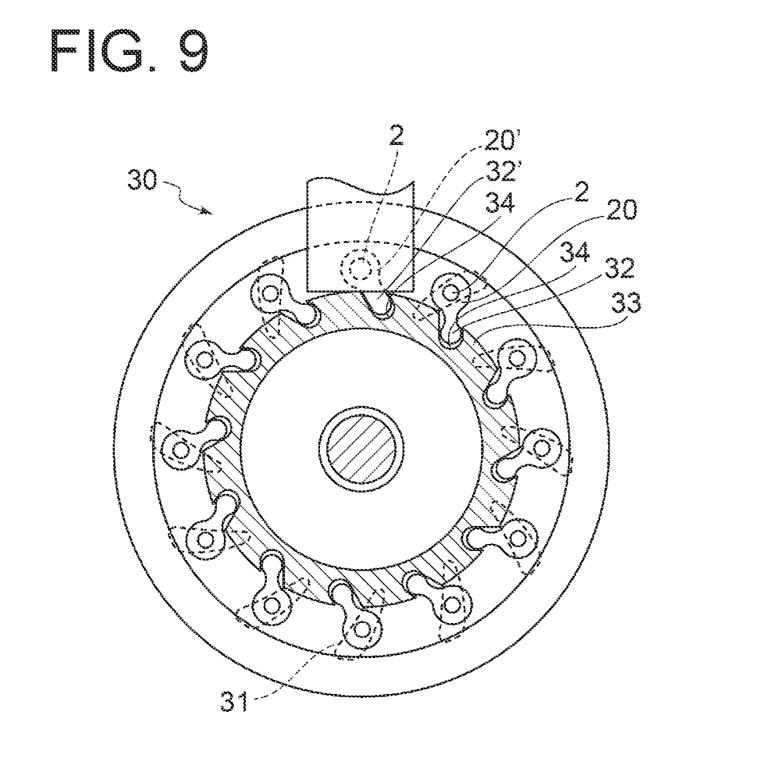
FIG. 9 is a configuration diagram of a link driving mechanism for a turbocharger according to a third embodiment of the present disclosure.

FIG. 9 shows a link driving mechanism 30 for a turbocharger including the driving device 20. The link driving mechanism 30 includes a rotatable coupling ring 33, a plurality of driving devices 20 to each of which a nozzle vane 31 is fixed, and one driving device 20' for rotating the coupling ring 33 to drive each of the plurality of driving devices 20. The plurality of driving devices 20 and one driving device 20' are arranged at intervals in the circumferential direction.

Figure 10:
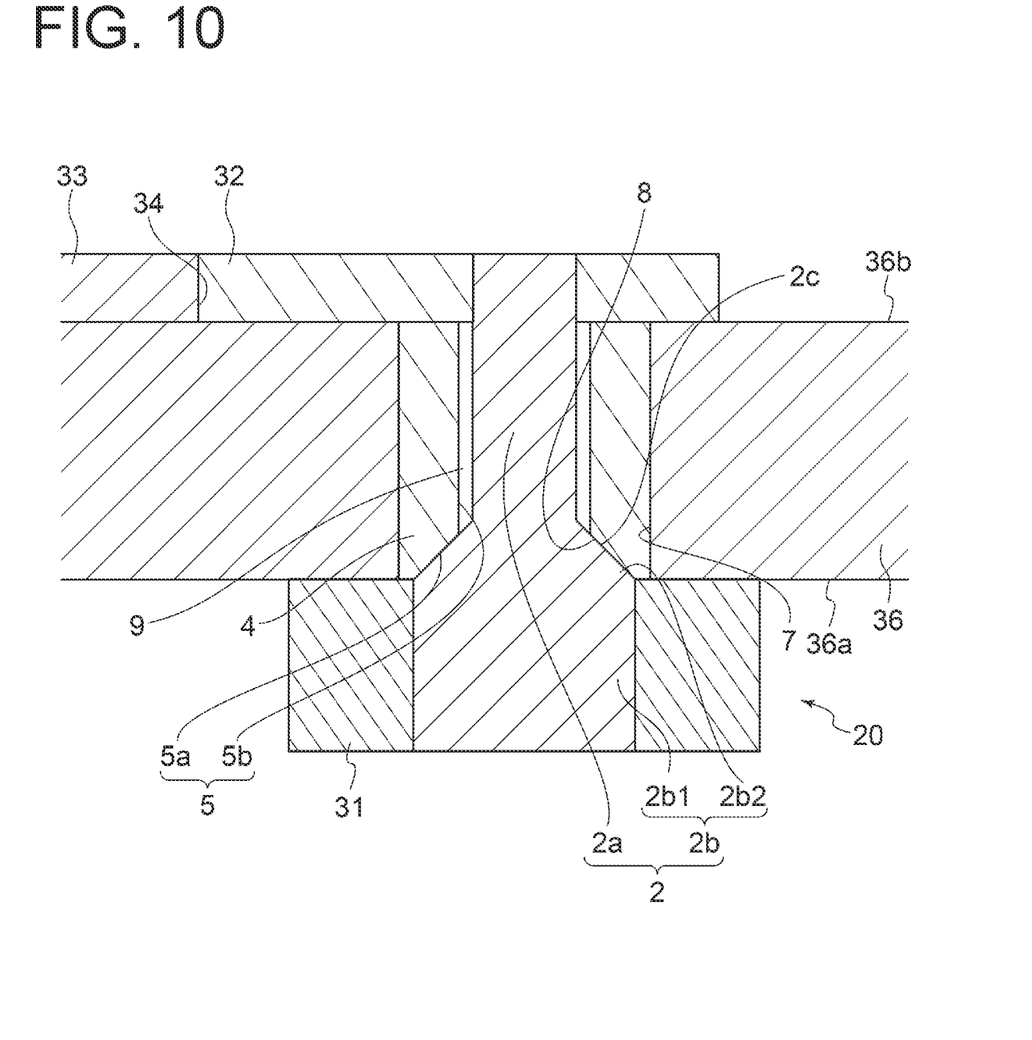
FIG. 10 is a schematic cross-sectional view of a driving device of the link driving mechanism for a turbocharger according to the third embodiment of the present disclosure.

As shown in FIG. 10, the driving device 20 includes a bush 4 inserted in a through hole 7 passing through a nozzle mount 36, which is a part of the turbine housing of the turbocharger, from an inner surface 36a to an outer surface 36b, and fixed to the nozzle mount 36, and a shaft 2 capable of inserting into an insertion hole 5 passing through the bush 4 in the axial direction. To an end of a shaft portion 2a of the shaft 2, a lever 32 is fixed as a coupling portion. To a large-diameter portion 2b1 of an abutment portion 2b of the shaft 2, the nozzle vane 31 of the turbocharger is fixed.

Figure 11:
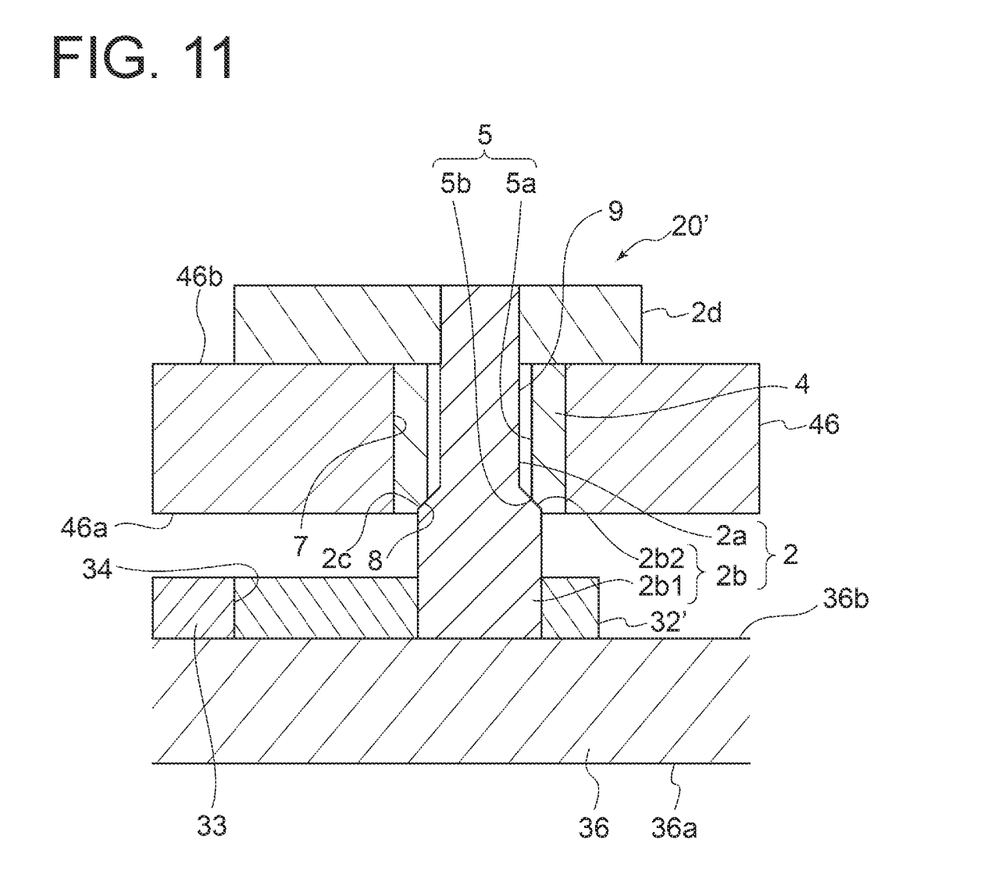
FIG. 11 is a schematic cross-sectional view of a driving device for rotating a coupling ring of the link driving mechanism for a turbocharger according to the third embodiment of the present disclosure.

As shown in FIG. 11, the driving device 20' includes a bush 4 inserted in a through hole 7 passing through a housing 46, which is a part of the turbine housing of the turbocharger, from an inner surface 46a to an outer surface 46b, and fixed to the housing 46, and a shaft 2 capable of inserting into an insertion hole 5 passing through the bush 4 in the axial direction. An end of the shaft 2 is provided with a coupling portion 2d coupled to an actuator (not shown) for rotating the shaft 2. To a large-diameter portion 2b1 of an abutment portion 2b of the shaft 2, a lever 32' is fixed as a coupling portion.

As shown in FIG. 9, cutout portions 34 are formed on the outer peripheral edge of the coupling ring 33 so as to be engaged with portions of the levers 32 and 32'. When the actuator coupled to the coupling portion 2d (see FIG. 11) of the driving device 20' is driven, power of the actuator is transmitted to the shaft 2 to rotate the shaft 2. With rotation of the shaft 2, the lever 32' rotates around the shaft 2. With rotation of the lever 32' engaged with the cutout portion 34, the coupling ring 33 rotates. When the coupling ring 33 rotates, the lever 32 engaged with each cutout portion 32 rotates. As a result, with rotation of each lever 32, the shaft 2 of the driving device 20 rotates. As shown in FIG. 10, with rotation of the shaft 2, the nozzle vane 31 rotates.

When the driving devices 20 and 20' are used in the link driving mechanism 30 for a turbocharger, with the same principle as in the first embodiment, the tilting of the shaft 2 is reduced, so that a reduction in sealing performance between the abutment portion 2b and the sealing surface 8 is suppressed. Thus, it is possible to suppress leakage of exhaust gas through the gap 9 formed between the shaft 2 and the bush 4 inside the insertion hole 5.

REFERENCE SIGNS LIST

1 Valve apparatus
2 Shaft
2a Shaft portion
2a1 End (of shaft portion)
2b Abutment portion
2b1 Large-diameter portion
2b2 Reduced-diameter portion
2c Abutment surface
2d Coupling portion
3 Valve body 4 Bush
4a First end surface (of bush)
4b Second end surface (of bush)
5 Insertion hole
5a Opening portion
5a1 End (of opening portion)
5b Small-diameter hole portion
6 Turbine housing
6a Inner surface (of turbine housing)
6b Outer surface (of turbine housing)
7 Through hole
8 Sealing surface
9 Gap
10 Elastic member
10a Spring
11 Actuator
12 Contact part
20 Driving device
20' Driving device
30 Link driving mechanism
31 Nozzle vane
32 Lever (Coupling portion)
32' Lever (Coupling portion)
33 Coupling ring
34 Cutout portion
36 Nozzle mount (Housing)
36a Inner surface (of nozzle mount)
36b Outer surface (of nozzle mount)
46 Housing
46a Inner surface (of housing)
46b Outer surface (of housing)

The invention claimed is:

1. A driving device comprising:
    a shaft; and
    a cylindrical bush having an insertion hole into which the shaft can be inserted,
    the insertion hole including an opening portion having an inner diameter decreasing from a first end surface toward a second end surface of the bush, and a small-diameter hole portion extending from an end of the opening portion to the second end surface,
    the shaft including a shaft portion having an outer diameter smaller than an inner diameter of the small-diameter hole portion, and an abutment portion having an outer diameter greater than the inner diameter of the small-diameter hole portion,
    wherein the abutment portion has a convexly curved shape,
    a gap is formed between the small-diameter hole portion and the shaft portion of the shaft inside the small-diameter hole portion for preventing adhesion or galling of a valve apparatus,
    the bush having a sealing surface of truncated cone shape configured as a surface extending obliquely inward from an inner peripheral edge of the first end surface to the end of the opening portion,
    wherein the driving device is configured such that the abutment portion of the shaft abuts on the sealing surface of the bush in an axial direction of the insertion hole so as to seal the gap is formed between the small-diameter hole portion and the shaft portion inside the insertion hole.

2. The driving device according to claim 1, wherein the abutment portion has an elliptical spherical shape having a major axis perpendicular or parallel to the axial direction of the insertion hole.

3. A valve apparatus comprising:
    the driving device according to claim 1; and
    a valve body fixed to the shaft.

4. A link driving mechanism for a turbocharger, comprising:
    the driving device according to claim 1; and
    a nozzle vane fixed to the shaft.

5. A link driving mechanism for a turbocharger, comprising:
    a rotatable coupling ring having at least one cutout portion; and
    the driving device according to claim 1,
    wherein the driving device has a coupling portion fixed to the shaft and capable of engaging with one of the at least one cutout portion.

6. The driving device according to claim 1, further comprising an elastic member which provides an elastic force for moving the shaft in a direction such that the abutment portion abuts on the sealing surface.

7. The driving device according to claim 6, wherein the driving device further comprises a housing having a bush through hole through which the bush passes,
    wherein the shaft includes a coupling portion to be coupled to an actuator for rotating the shaft, and
    wherein the elastic member is disposed between the coupling portion and the housing, and the elastic member provides the shaft with the elastic force in a direction of moving the coupling portion away from the housing.

* * * * *